United States Patent [19]
Liu et al.

[11] Patent Number: 5,155,837
[45] Date of Patent: Oct. 13, 1992

[54] METHODS AND APPARATUS FOR SOFTWARE RETROFITTING

[75] Inventors: Cheng-Chung Liu; Daniel S. Lo, both of Warren; Zaher A. Nazif, High Bridge; Fu-Lin Wu, East Brunswick; Donald W. Zobre, South Somerville, all of N.J.

[73] Assignee: Bell Communications Research, Inc., Livingston, N.J.

[21] Appl. No.: 317,919

[22] Filed: Mar. 2, 1989

[51] Int. Cl.$^5$ .................. G06F 9/00; G06F 15/00; G06F 11/00
[52] U.S. Cl. .................. 395/500; 354/232.3; 364/242.94; 364/265; 364/285; 364/933.8; 364/943.9; 364/962.1; 364/DIG. 1; 371/4
[58] Field of Search ............. 371/4; 364/200 MS File, 364/900 MS File

[56] References Cited

U.S. PATENT DOCUMENTS

| | | | |
|---|---|---|---|
| 4,558,413 | 12/1985 | Schmidt et al. | 364/200 |
| 4,788,637 | 11/1988 | Tamaru | 364/200 |
| 4,809,170 | 2/1989 | Leblang et al. | 364/200 |
| 5,008,814 | 4/1991 | Mathur | 364/200 |

OTHER PUBLICATIONS

"Life Cycle Support and Update of No. 4 ESS Software", E. A. Davis et al., IEEEE Document No. 0536-1486/82/0000-0216, p. 5G5.1, 1982.

Primary Examiner—Thomas C. Lee
Assistant Examiner—Ayni Mohamed
Attorney, Agent, or Firm—Leonard Charles Suchyta

[57] ABSTRACT

A time-shared computer system is disclosed in which computer software programs, either application programs or operating system programs, can be retrofitted with new programs which are totally incompatible with the old versions, all without interrupting service provided by the software programs. In a real time software system such as one providing telephone service, the processor (or processors in a multiprocessor system) is divided into two logical partitions. The old version of the software runs in one partition while the new version is loaded into and started up in the other partition. When the new version is verified to be properly operating, the data traffic is transferred from the old version parition to the new version partition in two steps. First the input data is switched to the new verison. When the transactions in progress in the old version are all completed, the output data is switched from the old version to the new version.

This software retrofitting on the fly is disclosed in connection with a telephone transaction processing system used to support special telephone services such as dial 800 calls and credit card calls.

10 Claims, 4 Drawing Sheets

METHODS AND APPARATUS FOR SOFTWARE RETROFITTING

TECHNICAL FIELD

This invention relates to computer software and, more particularly, to the replacement of defective or outdated software without removing the computer from active service.

BACKGROUND OF THE INVENTION

Currently, many computer-controlled systems must be available on substantially a full-time basis. Transaction processing systems, for example, sometimes must be accessible at any time of the day or night in order to permit ongoing activities. Telephone switching, and the supporting data processing transaction services, for example, must be available at all times. The supporting transaction processing system that permits "800 Calling" service and credit card calling is one such service. In the process of dialing 800 calls, for example, the telephone system must access a data base containing the appropriate translation of the 800 number into a standard telephone number for controlling the switching path. This is accomplished by routing the call to a special switching office called a Service Switching Point (SSP). The SSP switch launches a message requesting the necessary translation to an appropriate Switching Control Point (SCP) processor over a Common Channel Signaling (CCS) network made up of a plurality of redundant Signalling Transfer Points (STPs). The STPs, using addressing information in the header of the packet, ensure that the launched message packet is routed to the SCP having the required translation. The SCP, in turn, looks up the required information, encapsules it in a message packet and launches the message on the CCS back to the requesting SSP. The SSP then uses this information to select an appropriate inter-exchange carrier, if necessary, to deliver the telephone number to the carrier for completion of the call, or to complete the call in the local area.

In systems such as that described above, the software in the SCP must be of extremely high reliability and must be available essentially continuously. A serious problem therefore arises when it is necessary to update or change the software in an SCP. Removing the SCP from service for this purpose is not always possible, particularly if no suitable substitute is available. The present invention is directed at systems and methods for replacing or updating system software without removing the corresponding computer from service.

Every software application package is made up of a plurality of programmed processes designed to work together to produce the desired results. The operating system itself is likewise made up of a plurality of different processes working together. In order to ensure that the various programmed processes in a computer installation work together harmoniously, the interfaces between such processes are carefully crafted so that data passing between the processes is properly formated by the sending process so as to be properly received by the receiving process. If the inter-process protocols are not changed by the updating of one or more processes, then each process can be changed in situ, without regard for the other processes. One such a process replacement technique is disclosed in the copending application of B. A. Redman, Ser. No. 238,485, filed Aug. 31, 1988, now Pat. No. 4,954,941 and assigned to applicants' assignee.

On the other hand, when the software updating involves a plurality of processes and involves changes in the inter-process protocols, it is then necessary to ensure that all of the processes are changed simultaneously, or at least as a group, since none of the old processes will operate properly with any of the new processes. This problem is particularly difficult in real time data processing systems such as the telephone transaction processing system described above, where the software cannot be taken out of service for any significant length of time. It is toward software systems of this type that the present invention is directed.

In some systems of this type, it has become necessary to provide an entire second spare system to back up the main system. The new software is then installed on the back-up system, tested, and put on line by switching between systems. One such system is described in "Life Cycle Support and Update of No. 4 ESS Software," by E. A. Davis and R. J Healey, 1982 *IEEE Document No.* 0536-1486/82/0000-0216, page 5G5.1, 1982. It is extremely expensive, however, to provide and entire duplicate system, particularly simply to permit software retrofitting. More often, a single system, whether using one processor or many, must be updated without the luxury of a physical duplicate being available. It is toward this kind of environment that the present invention is directed.

SUMMARY OF THE INVENTION

In accordance with the illustrative embodiment of the present invention, entire application programs, or entire operating system programs, can be replaced with updated versions without substantially interrupting the service provided by the central processor or processors using the application programs or the operating system programs. More particularly, a central processing unit or units is split into two logical partitions, where a logical partition is a time-shared operating environment completely separate from and unconnected to the other logical partition. This can be accomplished simply by limiting access to only one or the other logical partition by incoming data signals. The old software is allowed to continue to execute in the first logical partition as if it were the entire processor. The software will, of course, run more slowly on the logical partition than on the entire processor, and hence service will be degraded somewhat. Meanwhile, the new software is loaded into the second logical partition and booted, all in the time-sharing mode so that operation of the first logical partition continues. Once the new software is started in the second logical partition, it is tested to see if it is operating correctly. If not, the process is rolled back, removing the second logical partition and allowing the first logical partition to assume control over the entire processor. If the new software is operating properly, the data input is switched from the first logical partition to the second logical partition, allowing the first logical partition to continue processing of the data in progress. The second logical partition begins processing new input data with the new programs while the first logical partition completes processing of the data in process using the old programs. When in process processing is completed on the first logical partition, the outgoing traffic is no longer taken from the first logical partition, but is now taken from the second partition. At this point, the first logical partition can be removed, allowing the second logical partition to assume control over the entire processor.

It can be seen that the system of the present invention, which may be called a software retrofitting system, allows entire software systems, whether application programs or operating system programs, to be replaced with updated versions without interrupting the operation of the data processing tasks. Moreover, the new and the old software systems need not be compatible in any sense other than that they run on the same hardware. That is, interprocess communications, either by direct transferral of messages or by leaving messages in common storage areas, need not be compatible in organization, timing or protocol, since the two versions run simultaneously and independently in the two logical partitions. Finally, the only penalty paid for such software updating on the fly is a slight deterioration in the speed of processing during the retrofitting period. Since the retrofitting can be entirely automated, such a period can be made extremely short.

BRIEF DESCRIPTION OF THE DRAWINGS

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Before proceeding to a detailed description of the present invention, a brief general description of a transaction processing system will be provided as an indication of a particular system in which the teachings of the present invention will find use. This specific system is chosen to more clearly illustrate the manner of using the present invention and should not be taken as limiting in any way. Those skilled in the art will readily appreciate how the teachings of the present invention can be applied to other high reliability, real-time computer processing systems to provide on-line software updating.

Figure 1:
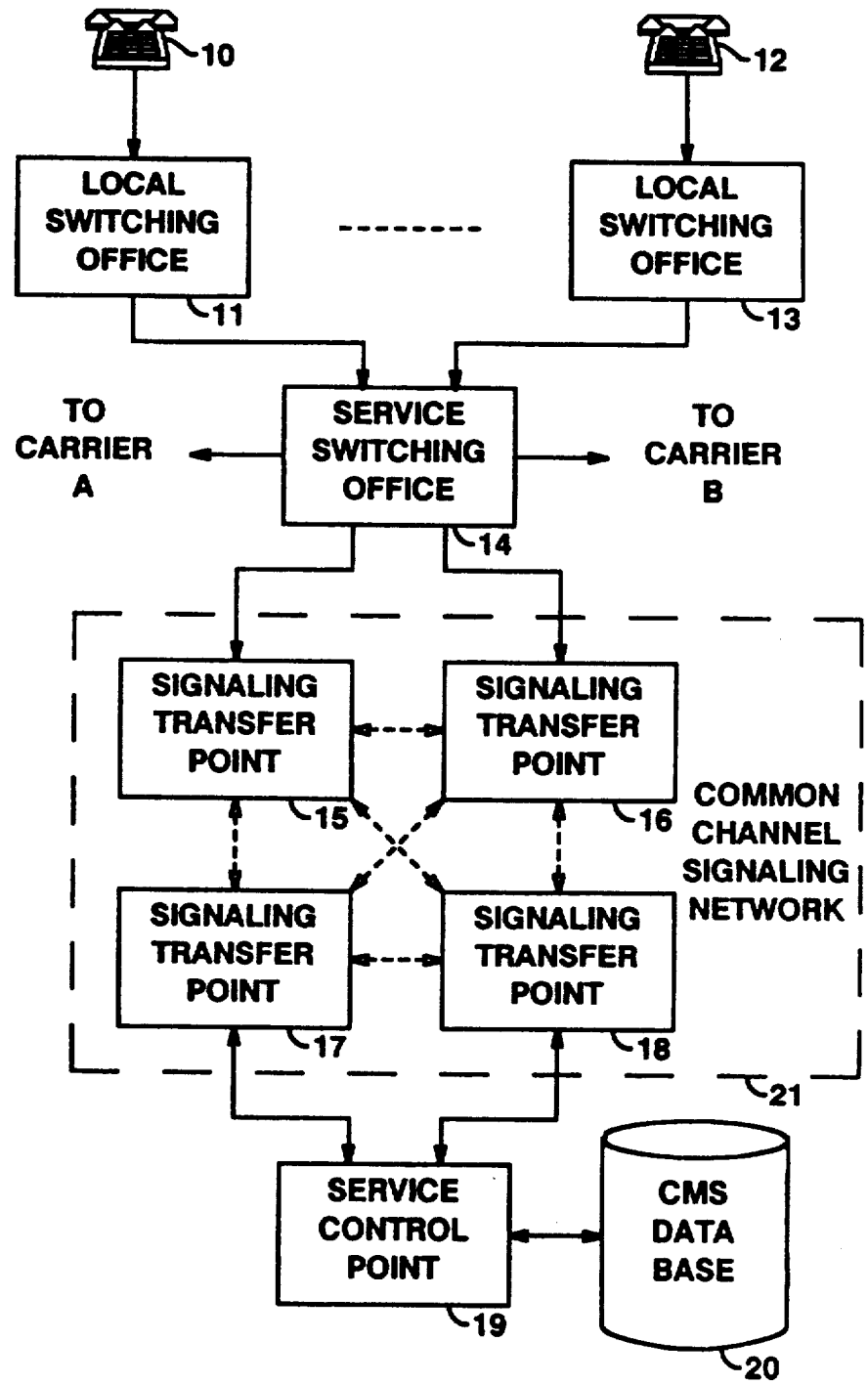
FIG. 1 is a general block diagram of a telephone transaction system such as is necessary to support special services such as "800" calls, and in which the present invention might find use.

Referring then to FIG. 1, there is shown a block diagram of the architecture of the telephone signaling network which uses transaction processing to support special kinds of telephone service such as 800 number calls and calling card services. In these systems, it is necessary for a local telephone switching office to respond to dialed digits by providing the appropriate special service. The actual service provided, however, is determined by the contents of one or more large remote data bases in which the particulars of the special service are described. In 800 calling service, for example, a remote data base would include the translation from the 800 number to an appropriate long distance direct dialed telephone number. As is known, such translations are usually not one-for-one, but involve such variables as the geographic location of the caller, the time of day, and so forth. Furthermore, the particular remote data base to be accessed is determined by the called party's location, since the 800 service is subscribed to by the called party.

Returning to FIG. 1, a caller at telephone 10 or 12 is connected to a telephone Local Switching Office (LSO) such as office 11 or office 13. As a result of the sequence of digits dialed from telephone 11 or 13, it is determined that a special service, e.g., 800 calling, is being requested. In that case, the call (the dialed digits) are forwarded to a Service Switching Point (SSP) office such as office 14. Office 14 has access to various long distance carriers (carrier A and carrier B) as well as to a packet message transmission network 21. Switching office 14 may simultaneously supply local telephone switching service to telephones connected to office 14 (not shown), similar to telephones 11 and 13 connected to offices 11 and 13 in FIG. 1. Network 21, called a Common Channel Signaling (CCS) network, is made up of a large plurality of packet switching nodes 15 through 18, called Signaling Transfer Points (STPs), through which data packets are routed by means of addresses in the headers of the packets. As suggested in FIG. 1, STPs 15-18 are multiply interconnected to provide multiple-path interconnections between any two points on the network. This multiple path access is provided to increase the reliability of connections through the CCS network 21. For the same reason, each access point to network 21 takes place with at least two STPs. Thus, SSP 14 has access to both STP 15 and STP 16 while Service Control Point (SCP) 19 has access to both STP 17 and STP 18. This high level of redundancy in the CCS network 21 ensures that a connection will be possible between any two access points regardless of failures in the data links or in the STP switching nodes. Such high reliability is an essential attribute of systems providing telephone service such as described here. The CCS network 21 is shown as including only four switching nodes and two access points for simplicity of the disclosure. In a real system, a very large number of such switching nodes, arranged hierarchically, connect a very large number of access points in a network of national or international scope.

The data to be accessed in order to support the special telephone services is stored in a plurality of large data bases such as data base 20 in FIG. 1. In order to support such services, e.g., 800 calling service, a Call Management Services (CMS) data base 20 is provided, connected to the CCS network 21 through a Service Control Point (SCP) computer system 19. The function of SCP 19 is to receive database query packets from network 21, formulate them into requests for data from database 20, forward such requests to database 20, receive the responses, and formulate the responses into messages to be launched on network 21, addressed to the same Service Switching Office (SSO) from which the query originated. Moreover, it is to be understood that hundreds of thousands or millions of such data base access transactions must be handled every day, day in and day out, for twenty-four hours every day. As noted above, the entire system must be highly reliable in order to ensure availability of such special services whenever called for. The fault tolerant archetecture of such systems is disclosed and claimed in the copending application of J. O. Boese et al., Ser. No. 125,463, filed Nov. 25, 1987, and assigned to applicants' assignee.

Figure 2:
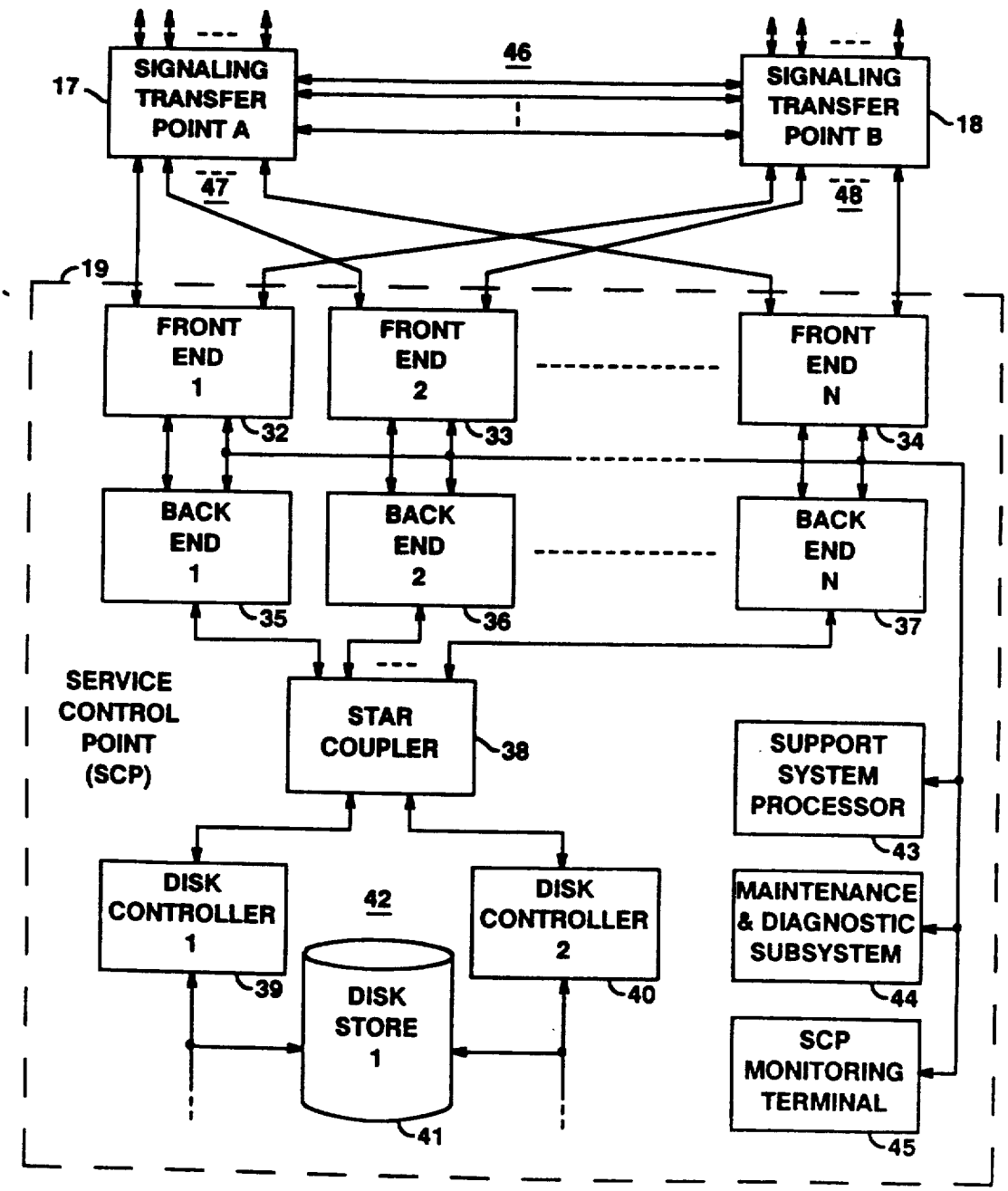
FIG. 2 is a general block diagram of the hardware architecture of the Service Control Point computer system of FIG. 1 in which the software retrofitting system of the present invention might find use.

Referring to FIG. 2, there is shown a general block diagram of the Switching Control Point 19 of FIG. 1. The Signaling Transfer Points 17 and 18 are also shown in FIG. 2. STPs 17 and 18 are connected to each other by a plurality of data links 46 to allow SCPs 17 and 18 to exchange data should a failure occur in either one of them. Similarly, each of STPs 17 and 18 has a plurality of incoming data links connecting to the other STPs shown in FIG. 1. The Service Control Point computer 19 is actually composed of a plurality of front end computers 32, 33, . . . , 34 and a plurality of corresponding back end computers 35, 36, . . . , 37. STP 17 is connected, via data links 47, to each of front end computers 32-34 while STP 18 is also connected, via data links 48, to each of front end computers 32-34. These multiple cross-connections provide the redundant connectivity necessary to maintain service in the face of data link failures.

As is well-known in the art, the Service Control Point 19 is a multiprocessor computer in which the processors are divided into front end, communications, processors and back end, application processors. Indeed, each of front end processors 32-34 is connected to a respective one of back end processors 35-37 to form processing pairs. All of the back end processors 35-37 are connected to a star coupler 38 by means of which they communicate with a disk storage subsystem 42. Disk storage subsystem 42 comprises a pair of disk controllers 39 and 40 and a plurality of dual port disk storage drives similar to disk store 41. The two disk controllers 39 and 40 allow each of back end processors 35-37 to communicate with any of the disk storage units. Moreover, should any disk controller fail, access can be had to all of the disk stores by way of the other disk controller and the dual port on the disk drive. Thus the multiple redundancy is carried out in the disk storage system as well as the processors. The disk storage subsystem 42, of course, contains the data base which must be accessed in response to a received message in order to acquire the data necessary to respond to the received message.

All of the front end processors 32-34 and all of the back end processors 35-37 are connected to a system support interface processor 43, a maintenance and diagnostic subsystem 44 and a monitoring terminal 45. Using terminal 45, the SCP 19 can be reconfigured to leave out any processor or any disk storage unit in order to perform routine maintenance, to isolate a failed unit, or to expand the number of units in the SCP because of increases in traffic. The maintenance and diagnostic subsystem 44 monitors all of the other units to detect failures and hence includes all of the testing software as well as the reconfiguration software. Using the terminal 45, service personnel are able to access the support system processor 43 to supervise the configuration and operation of SCP 19. All of the elements of FIG. 2 are described in further detail in the aforementioned patent application of J. O. Boese et al. and will not be further described here.

Figure 3:
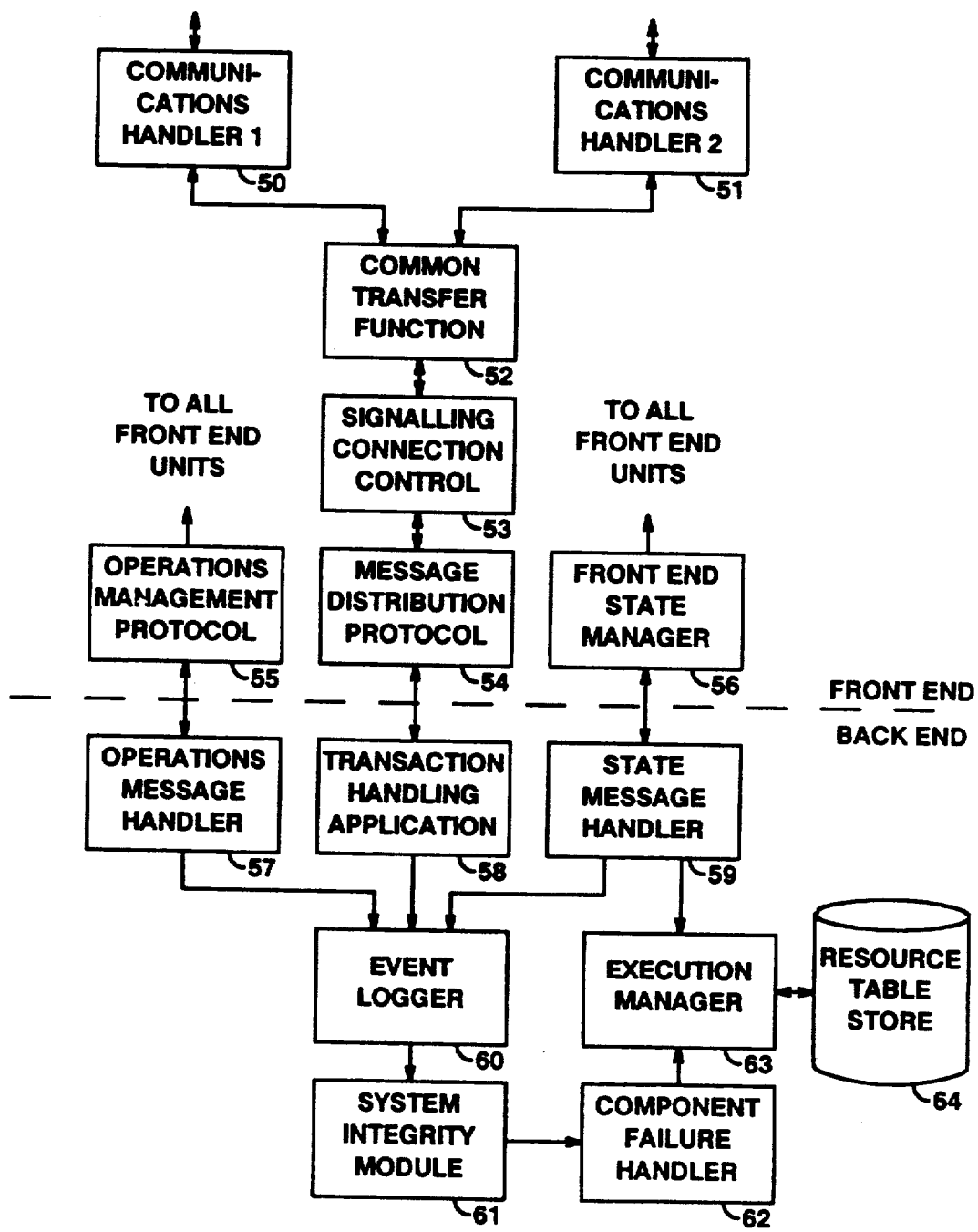
FIG. 3 is a general block diagram of the software architecture of the Service Control Point computer system show in FIG. 1.

In FIG. 3 there is shown a block diagram of the software systems residing in each pair of front end and back end processors in FIG. 2. The dashed line near the center of FIG. 3 separates the software processes in the front end processor (above the dashed line) from the software processes in the back end processor (below the dashed line). As previously noted, the front end processor is used for communications handling processes while the back end processor is used for application and system operation processes. The front end processor and the back end processor communicate with each other across the dashed line by means of messages passes back and forth over the connecting data link.

As shown in FIG. 3, the front end processor includes software processes including communications handlers 50 and 51, connected as shown in FIG. 2 to the Signaling Transfer Points 17 and 18. Communications handlers 50 and 51 are each able to receive data packet messages from the connected STP, strip off the header information and check the message for errors using well known cyclic redundancy checks. For messages traveling in the outbound direction, communications handlers 50 and 50 create the message packets by assembling a data message, a header and redundant error checking information, and launch the packets onto the CCS network 21 (FIG. 1). In response to information received from CCS network 21, handlers 50 and 51 also effectively disconnect failed data links and failed STPs by routing all traffic by alternate routes. Handlers 50 and 51 are connected to common transfer function process 52 which sequences the messages to and from the message handlers 50-51 to allow the balance of the system to handle messages one-at-a-time. Message distribution protocol process 54 interfaces between the messages formats received from handlers 50 and 51 and the message formats necessary to communicate with the back end processor. An operations management protocol process 55 exchanges messages with the back end processor for the purpose of coordinating the operation of the two processors. System parameters, operational links, in-service subsystems and so forth are identified in the local processor and transmitted to the other processor via operations management protocol process 55.

The states of all of the hardware components and all of the software components of the front end processor are monitored by front end state manager 56. Messages supplying this information are formulated in state manager 56 and exchanged with the back end processor, where the actual state management takes place.

In the back end processor, the transaction handling application processes 58 accept the data query messages from the CCS network 21, access the local data base (database 20 in FIG. 1) to obtain the desired information, and pass the retrieved information back to the front end processor for launching on the CCS network 21. This is the major activity going on in the SCP and takes up the great majority of the resources. The other activities depicted in FIG. 3 are support activities which assist in ensuring the availability and the proper operation of the application processes 58.

The operations message handler 57 exchanges operations management messages with process 55 to integrate the operation of the front endback end pair, as well as interact with the other front end and back end processors in the SCP. The state message handler 59 exchanges status messages with process 56 to maintain a continuous second-by-second indication of the status of all of the hardware and software units of the front end-back end pair. The execution manager process 63 uses this status information to maintain a current up-to-date record of the system availability information in resource table store 64. The messages received by handlers 57 and 59 are logged in by event logger process 60. System integrity module 61 uses the information available in these messages to test for proper system integrity. If component failures occur, failure handler 62 provides the appropriate algorithms to deal with the failure. Execution manager 63, using the information in resource table store 64, determines the proper reconfiguration necessary to continue processing, and uses the operations message handler 57 to carry out the reconfiguration in the front end processor.

The highly reliable distributed data processing system described in connection with FIGS. 1-3 is merely illustrative of the type of system in which the software retrofitting scheme of the present invention will find use. Since further details of the telephone service data query system of FIGS. 1-3 will not add to the understanding of the present invention, and since such details are readily available in the aforementioned copending application of J. W. Boese et al., further discussion of the system will not be undertaken. It is sufficient to note that certain data processing systems must be available essentially continuously, and hence cannot be taken out of service for software upgrading. Telephone service providing software is just one example of this type of system. Others might include airline reservation systems, medical facility life support monitoring systems and spacecraft navigation systems. Other such systems will be readily apparent to those of ordinary skill in this art.

Figure 4:
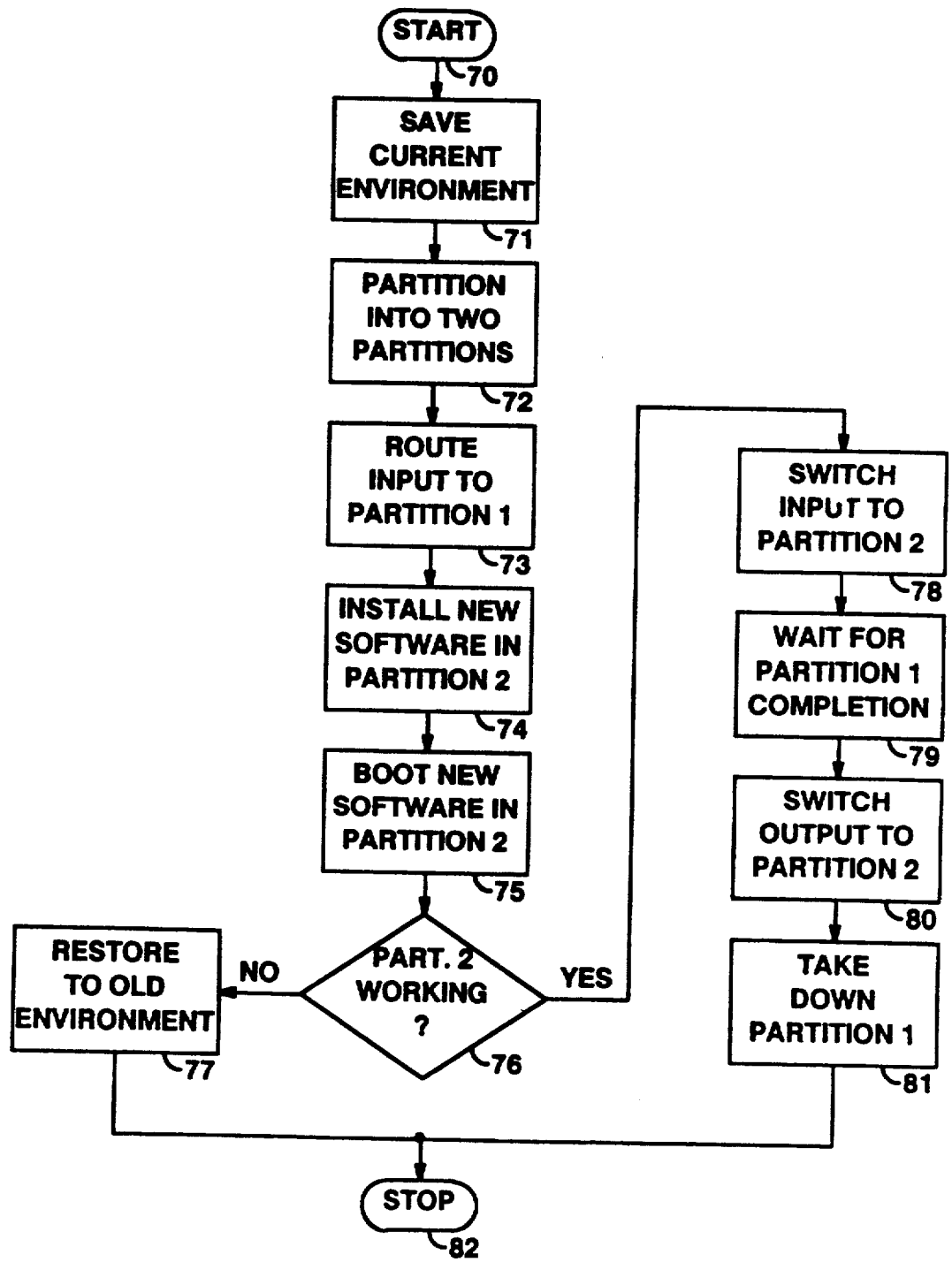
FIG. 4 is graphical flowchart of the retrofit method of the present invention.

In FIG. 4 there is disclosed a flowchart of a software retrofitting system in accordance with the present invention. Starting at start terminal 70, box 71 is entered where the current environment is saved. By this is meant that the contents and status of all registers, processes and storage units are "saved" in a special memory location. The object of such an environment save is to allow the restoration of the exact status quo at a later time in case some failure occurs in the software retrofitting procedure. Thus the "environment" encompasses all of the information about the state of the system which will be necessary to restore the system to exactly the same state it was in when the environment was saved.

In box 72, the processors, such as front end processors 32-34 and back end processors 35-37 in FIG. 2, are partitioned into two logical partitions. That is, the storage space available to each processor, and the processor execution time of each processor, are divided into exactly two portions called "logical partitions." Each logical partition includes processes which are allowed to execute alternatively and each logical partition is allowed to access only the storage space assigned to that partition. A logical partition can include all of the software used in the processor, or only a portion of the software in the processor. In a time-shared processor using memory paging techniques, such logical partitioning is straightforward. The penalty paid for such logical partitioning is, of course, the slow-down in the execution of tasks by the processes in the different partitions. In highly redundant systems such as that illustrated in FIGS. 1-3, such slow-downs can be accommodated by other parallel processors. Otherwise, the penalty is a degradation in the service provided for the duration of the partition. The old software is allowed to reside in the first partition.

In box 73, all input data, queries in the system of FIGS. 1-3, are routed to the partion containing the old software. In box 74, the new software is installed into the second partition. This software was, of course, previously made available in memory, such as disk system 42 of FIG. 2, which is accessible by the new software partition. In box 75, the new software is booted into operation in the new software partition. In decision box 76, the new software is tested to see if it is operating properly. This test may be as extensive as desired, always recalling that the testing period adds to whatever service degradation period is engendered by the partitioning. If the new software fails the tests of decision box 76, box 77 is entered and the processors are restored to the old environment saved in box 71. It will be noted that the environment which is restored precedes the partitioning of the processors and hence removes all evidence of the attempt to upgrade the software. After the restoration in box 77, termination box 82 is entered to terminate the procedure of FIG. 4.

If the tests in decision box 76 indicate that the new software is working properly in its partition, then box 78 is entered in which the input is switched to the new software partition. The new software therefore begins operating on the new input data in accordance with the new programs, presumably incorporating improved and enchanced operations, and eliminating inefficiencies, deficiencies and "bugs" in the old software. In box 79, the retrofitting system of FIG. 4 waits until all of the data in the old software partition is fully processed. In the system of FIGS. 1-3, all of the queries sent to the old software partition will have been processed, the appropriate data retrieved from store 20 and the response launched on network 21. In addition, all local housekeeping tasks such as status updates (block 56, FIG. 3) connected with the retrieval, event logs (block 60, FIG. 3), and so forth, will likewise have been completed. Once the old software partition has completed all of the processing that can be done on the input data supplied to it before the switch in box 78, box 80 is entered to switch the output receiving systems from the old software partition to the new software partion. In the system of FIGS. 1-3, the input to the star coupler 38 is taken from from the new software partition, as are the inputs to the ancillary systems 43, 44 and 45. At this point, all of the input is being routed to the new software partition, processed with the upgraded software, and delivered from the new software partition to the appropriate output systems. The old software partition is now idle since all of the in-progress work has been flushed out of the old software partition. Therefore, in box 81, the old software partition is taken down and removed. The new software partition therefore takes over the control of the entire processor time and the entire available memory, thus returning the system to non-degraded service status. The retrofitting procedure of FIG. 4 can then be terminated in box 82.

It is readily apparent that the procedure of FIG. 4 can be most easily be implemented in a software process resident in the operating systems of all of the processors on which such partitioning must be done. Prior to the initiation of the retrofit, the new versions of the programs are loaded into local memory (such as disk store 42 in FIG. 2). The retrofitting procedure can then be initiated to partition the local processor or processors, load the new version, test the new version, switch input to the new version, monitor the completion of processing in the old version, and switch output to the new version. The software programs necessary to carry out these steps are readily apparent to any person of ordinary skill in the art from a perusal of FIG. 4 and of the descriptions herein contained. The procedure of FIG. 4, however, may also be implemented in fixed wiring of control circuitry attached to and made part of the data processing system. The choice of whether to use a software implementation or a hardware implementation is an economic decision rather than a technical decision. In either event, the procedure of FIG. 4 is preferably made entirely automatic, hence making the duration of the degraded service, if there is any such degradation, minimal.

It will be noted that, although the retrofitting procedure of FIG. 4 has been described in connection with a telephone transaction processing system and, more particularly, in connection with as data base accessing system called a Service Control Point, the procedure of FIG. 4 is perfectly general in its application. That is, the procedure of FIG. 4 can be used with any data processing system which must be available substantially continuously and the software of which must nevertheless be upgraded from time to time. Indeed, the procedure of FIG. 4 can be used just as effectively to upgrade the operation of the Signaling Transfer Points 15-18 of FIG. 1, assuming that these subsystems are also data processor controlled. Moreover, the extent of the partitioning can be fashioned to exactly match the extent of the retrofitting. That is, if the contents of the CMS data base 20 of FIG. 1 must also be reworked, as well as the processes of SCP 19, the partitioning can be extended to include the data base 20. The input and output points will, of course, then be adjusted to exactly bracket the enlarged subsystem partitions. On the other hand, if smaller subsystems of the SCP 19, such as the communications handlers 50 and 51, are the only software components to be upgraded, the partitions can be limited to only those subsystems and the input and output points adjusted accordingly.

It therefore appears that the system and procedure of the present invention are perfectly general in their application to data processing systems of varying degrees of complexity and of distributed processing. The present invention ensures continuity of processing despite extensive software changes and the ability to gracefully roll back to the status quo ante if the new software operates improperly.

It should also be clear to those skilled in the art that further embodiments of the present invention may be made by those skilled in the art without departing from the teachings of the present invention.

What is claimed is:

1. A software retrofitting facility for replacing software in a data processing system without taking said data processing system from service, said facility comprising means for dividing at least one portion of at least one central processor into two logical partitions, each partition being capable of carrying out data processing operations independent of the other partition, means for executing an old version of said software in one of said partitions and for concurrently executing a new version of said software in the other of said partitions, means for testing said new software, means, responsive to said testing means, for switching the data input from said old software to said new software, means for detecting the completion of execution by said old software, and means responsive to said completion detecting means for switching the output receiving means from said old software to said new software and for removing said old software partition.

2. The software retrofitting facility according to claim 1 wherein said software comprises a system of application programs.

3. The software retrofitting facility according to claim 1 wherein said software comprises the operating system for said processor.

4. The software retrofitting facility according to claim 1 wherein said at least one central processor comprises a plurality of interdependent processing units.

5. The software retrofitting facility according to claim 4 wherein said interdependent processing units comprise at least two classes of processors including communications processors and application processors.

6. The software retrofitting facility according to claim 4 wherein said plurality of interdependent processing units exchange messages among said plurality of processing units.

7. A method for replacing old software with new software in a data processing system having data input means and output receiving means without taking said data processing system from service, said method comprising the steps of dividing at least one portion of at least one central processor into two logical partitions, each partition being capable of carrying out data processing operations independent of and concurrent with the other partition, executing said old software in one of said partitions and executing said new software in the other of said partitions, testing said new software for proper operation, in response to said testing step, switching said data input means from said old software to said new software, detecting the completion of execution of said old software, and in response to said completion detecting step, switching said output receiving means from said old software to said new software and removing said old software.

8. The software replacing method according to claim 7 wherein said step of dividing at least one central processor comprises the step of dividing the operations of a plurality of interdependent processing units.

9. The software replacing method according to claim 8 wherein said step of dividing operations comprises the step of dividing operations in at least two classes of processors including communications processors and application processors.

10. The software replacing method according to claim 8 further including the step of interchanging messages between said interdependent processing units in each of said respective partitions.

* * * * *